United States Patent [19]

Choi

[11] Patent Number: 5,537,439
[45] Date of Patent: Jul. 16, 1996

[54] DECISION DIRECTED ALGORITHM CONTROL METHOD

[75] Inventor: Yang-seok Choi, Kyungki-do, Rep. of Korea

[73] Assignee: Samsung Electronics Co., Ltd., Kyungki-Do, Rep. of Korea

[21] Appl. No.: 253,140

[22] Filed: Jun. 2, 1994

[30] Foreign Application Priority Data

Jun. 2, 1993 [KR] Rep. of Korea .................. 1993-9869

[51] Int. Cl.$^6$ ........................................... H03H 7/30
[52] U.S. Cl. ..................... 375/232; 375/229; 364/724.2
[58] Field of Search ............................ 375/14, 15, 11; 364/724.19, 724.20; 333/18, 28 R

[56] References Cited

U.S. PATENT DOCUMENTS

| | | | |
|---|---|---|---|
| 5,263,033 | 11/1993 | Seshadri | 375/39 |
| 5,311,546 | 5/1994 | Paik et al. | 375/14 |

OTHER PUBLICATIONS

Choi et al. "Adaptive Blind Equalization Coupled With Carrier Recovery for HOTY Modem" IEEE vol. 39 Aug. 93.
Picchi et al. "A Blind SAG–SO–DFD–FS Equalizer" IEEE 1988 pp. 0957–0960.

Primary Examiner—Stephen Chin
Assistant Examiner—T. Ghebretinsae
Attorney, Agent, or Firm—Sughrue, Mion, Zinn, Macpeak & Seas

[57] ABSTRACT

A method for adaptively turning on or off a decision directed algorithm (DDA) is performed according to the convergence state of the data to be equalized in a blind equalization system for use in a digital communication receiver. Each quadrant of a two-dimensional plane having an I-axis and Q-axis is divided into two decision areas. Then, a sign pair of actual error estimation data is calculated with respect to each area. If the decision error of the received symbol data is calculated, it is determined whether the sign of the decision error coincides with that of the actual error estimation data. The DDA is performed with respect to the symbol data of which the sign coincides with each other to update the equalization coefficient. The method further reduces the number of decision areas for dividing the plane formed by the I-axis and Q-axis in which the symbol data is arranged, to permit faster convergence speed and to further suppress the ratio of the symbol error.

5 Claims, 5 Drawing Sheets

DECISION DIRECTED ALGORITHM CONTROL METHOD

BACKGROUND OF THE INVENTION

The present invention relates to a blind equalization system for use in a receiver (e.g., a modem) in a digital communication system, and, more particularly, to a method for adaptively controlling an on-and-off operation of a decision directed algorithm.

In digital communication systems, a transmitter inserts a predetermined training sequence into a transmission signal at a certain interval of the transmission signal, and transmits the inserted signal to a receiver. The receiver, on the other hand, detects and recognizes this training sequence, thereby discriminating channel characteristics of the transmitted signal. This allows the receiver to perform signal equalization with respect to the sequentially received signal according to an equalization coefficient which is determined by the discriminated channel characteristics. However, the transmitter may not transmit the transmission signal together with the training sequence. In this case, the receiver does not know the pattern and state of the received signal. Thus, a blind equalization method capable of updating the coefficients of an equalizer only with the received signal is employed.

The blind equalization method uses algorithms such as a Godard algorithm, a stop-and-go algorithm (SGA), and a decision-directed algorithm (DDA), as examples.

The Godard algorithm performs excellent compensation operation with respect to channel distortion irrespective of any phase error. However, its convergency rate is slow, and thereafter dispersion on the constellation of the data symbol occurs. Thus, for fine tuning operations, it is necessary to convert the Godard algorithm into the DDA. On the other hand, the DDA is not converged until the channel distortion of the received signal is removed to a degree. Thus, when equalization is performed using the DDA at the state where the Godard algorithm has not been firstly performed, convergency of the equalization coefficient cannot be expected. Thus, to perform more effective equalization, conversion of the Godard algorithm into the DDA should be timely accomplished. Moreover, if the SGA is used for on-and-off control of the DDA, an equalizer having better performance than that using only the Godard algorithm and the DDA can be obtained.

With reference to FIGS. 1 and 2, a conventional blind equalization system for the on-and-off controlling of the DDA using the SGA will be described.

FIG. 1 is a block diagram showing part of a general blind equalization system. In a general blind equalization system as shown in FIG. 1, an SGA executer 14 supplies to a blind equalizer 11 an equalization coefficient $C_n$ which is updated by the following equations (1) and (2).

$$C_{n+1,R} = C_{n,R} - \alpha(f_{n,R} \hat{e}_{n,R} Y_{n,R} + f_{n,I} \hat{e}_{n,I} Y_{n,I}) \quad (1)$$

$$C_{n+1,I} = C_{n,I} + \alpha(f_{n,R} \hat{e}_{n,R} Y_{n,I} - f_{n,I} \hat{e}_{n,I} Y_{n,R}) \quad (2)$$

The first equation (1) represents the real part of the equalization coefficient $C_n$, and the second equation (2) represents the imaginary part thereof. Here, C. is a coefficient vector of an equalizer, $Y_n$ is an input vector of the equalizer, ê is an error vector, and $\alpha$ is a step size of the SGA. The error vector ê is represented by the following equation.

$$\left. \begin{array}{l} \hat{e}_{n,R} = Z_{n,R} - \hat{a}_{n,R} \\ \hat{e}_{n,I} = Z_{n,I} - \hat{a}_{n,I} \end{array} \right\} \quad (3)$$

Here, $Z_n$ is output data of the blind equalizer 11, and $\hat{a}_n$ is decision point data which is output from a decision device 15.

FIG. 2 illustrates the concept of the error vector $\hat{e}_n$. The dotted lines of FIG. 2 represent decision boundary lines for determining signals which are quadrature amplitude modulated and then transmitted. The SGA executer 14 uses the DDA and determines data $\hat{a}_n$ of the decision point which is closest to the equalized data $Z_n$ as the transmitted signal, and updates the equalization coefficients of the blind equalizer 11 according to the error vector $\hat{e}_n$, which is the difference between the decision point data $\hat{a}_n$ and the equalized data $Z_n$.

The most important reason why the DDA is not converged is due to decision errors corresponding to the above-described error vector $\hat{e}_n$. If a transmission path is not a multiplexed path and only small noise exists in the transmission signal without having a phase error, the error vector $\hat{e}_n$ is nearly the same as the actual error which is produced in the transmission signal. Accordingly, the DDA can be better converged. However, if the actual signal transmission channel is a multiplexed path, and the received signal is wrongly restored by the noise and the non-linear filtering, the equalized signal comes out of the decision boundary and is located in a different place. Thus, the error vector $\hat{e}_n$ becomes different from the actual error. Taking 32 quadrature amplitude modulation (QAM) as an example, the DDA maps the equalized data with one of the 32 points which are closest to the equalized data. Accordingly, the probability of the decision error becomes high. As a result, the DDA cannot converge the equalization coefficient into an optimal value.

Therefore, the SGA executer 14 does not use the error vector $\hat{e}_n$ of equation (3) which is produced for the received data by the DDA, but, rather, controls the DDA using equations (4) and (5).

$$\left. \begin{array}{l} \bar{e}_{n,R} = Z_{n,R} - (sngZ_{n,R})\beta_n \\ \bar{e}_{n,I} = Z_{n,I} - (sngZ_{n,I})\beta_n \end{array} \right\} \quad (4)$$

$$f_{n,R} = \left\{ \begin{array}{l} 1 \text{ when } sgn \, \hat{e}_{n,R} \text{ equals } sgn \, \bar{e}_{n,R} \\ 0 \text{ when } sgn \, \hat{e}_{n,R} \text{ does not equal } sgn \, \bar{e}_{n,R} \end{array} \right.$$

$$f_{n,I} = \left\{ \begin{array}{l} 1 \text{ when } sgn \, \hat{e}_{n,I} \text{ equals } sgn \, \bar{e}_{n,I} \\ 0 \text{ when } sgn \, \hat{e}_{n,I} \text{ does not equal } sgn \, \bar{e}_{n,I} \end{array} \right. \quad (5)$$

The data $\bar{e}_n$ in equation (4) is the actual error estimation data which is called a Sato-like error obtained by subtracting a sign of the data (sgn $Z_n$) multiplied by a predetermined coefficient $\beta_n$ from the output data $Z_n$ of the equalizer 11. The SGA executer 14 performs the DDA when the sign of the error vector $\hat{e}_n$ coincides with the sign of the actual error estimation data $\bar{e}_n$ in equation (5). When the signs do not coincide with each other, the DDA is not performed. The distribution state of the actual error estimation data $\bar{e}_n$ is shown in FIG. 3.

FIG. 3 is a conceptual diagram illustrating a conventional decision area dividing method. In FIG. 3, the horizontal axis is an in-phase (I) axis, and the vertical axis is a quadrature (Q) axis. In FIG. 3, a solid line represents a decision boundary for discerning each decision area. In each decision area, sign pairs "(+,+), (+,−), . . . " of the actual error estimation data $\bar{e}_n$ include "(a sign of the real part, a sign of the imaginary part)," respectively. Here, the size of the decision boundary is adjusted by the predetermined coefficient $\beta_n$ in equation (4). The value of the coefficient $\beta_n$ is experimentally obtained according to the characteristics of the equalization system. If the I-axis and the Q-axis are divided into four areas, respectively, using the decision boundary, the probability of the decision error is decreased. However, considering the two-dimensional plane which is formed of the I-axis and Q-axis, the symbol constellation is divided into sixteen decision areas by the I-axis and Q-axis which are divided into the four areas as shown in FIG. 3.

SUMMARY OF THE INVENTION

Therefore, to solve the above problems, it is an object of the present invention to provide a decision directed algorithm control method capable of further reducing the probability of a decision error by further improving a conventional stop and go algorithm which uses sixteen decision areas to further decrease the number of decision areas.

To accomplish the above and other objects of the present invention, there is provided a decision directed algorithm control method for adaptively controlling an on-and-off operation of a decision directed algorithm for use in a blind equalization system of a digital communication receiver. The decision directed algorithm control method includes the steps of:

a) dividing each quadrant in a two-dimensional plane formed of a real number axis and an imaginary number axis, into two decision areas, b) determining which decision area among the decision areas includes output data of an equalizer, c) calculating a sign of actual error estimation data $\tilde{e}_n$ according to the result of step b), d) calculating decision error data ($\hat{e}_n$) using the following equations with output data ($Z_n$) of the equalizer and the finally decided data ($\hat{a}_n$):

$$\hat{e}_{n,R} = Z_{n,R} - \hat{a}_{n,R}$$

$$\hat{e}_{n,I} = Z_{n,I} - \hat{a}_{n,I},$$

e) comparing a sign of the real part and a sign of the imaginary part of the respective decision error data $\hat{e}_n$ and the respective actual error estimation data $\tilde{e}_n$ with each other, and f) executing an algorithm which is represented by the following equations with respect to the real part and the imaginary part, respectively, according to the result of step e):

$$C_{n+1,R} = C_{n,R} - \alpha(f_{n,R} \cdot \hat{e}_{n,R} \cdot Y_{n,R} + f_{n,I} \cdot \hat{e}_{n,I} \cdot Y_{n,I}),$$

and $$C_{n+1,I} = C_{n,I} - \alpha(f_{n,R} \cdot \hat{e}_{n,R} \cdot Y_{n,I} - f_{n,I} \cdot \hat{e}_{n,I} \cdot Y_{n,R})$$

$$\text{wherein, } f_{n,R} = \begin{cases} 1 \text{ when } sgn \, \hat{e}_{n,R} = sgn \, \tilde{e}_{n,R} \\ 0 \text{ when } sgn \, \hat{e}_{n,R} \neq sgn \, \tilde{e}_{n,R} \end{cases}$$

$$\text{wherein, } f_{n,R} = \begin{cases} 1 \text{ when } sgn \, \hat{e}_{n,I} = sgn \, \tilde{e}_{n,I} \\ 0 \text{ when } sgn \, \hat{e}_{n,I} \neq sgn \, \tilde{e}_{n,I} \end{cases}$$

wherein $\alpha$ is a step size and $Y_n$ is data to be equalized.

DETAILED DESCRIPTION OF A PREFERRED EMBODIMENT

A preferred embodiment of the present invention will be described below in more detail with reference to the accompanying drawings.

Figure 10:
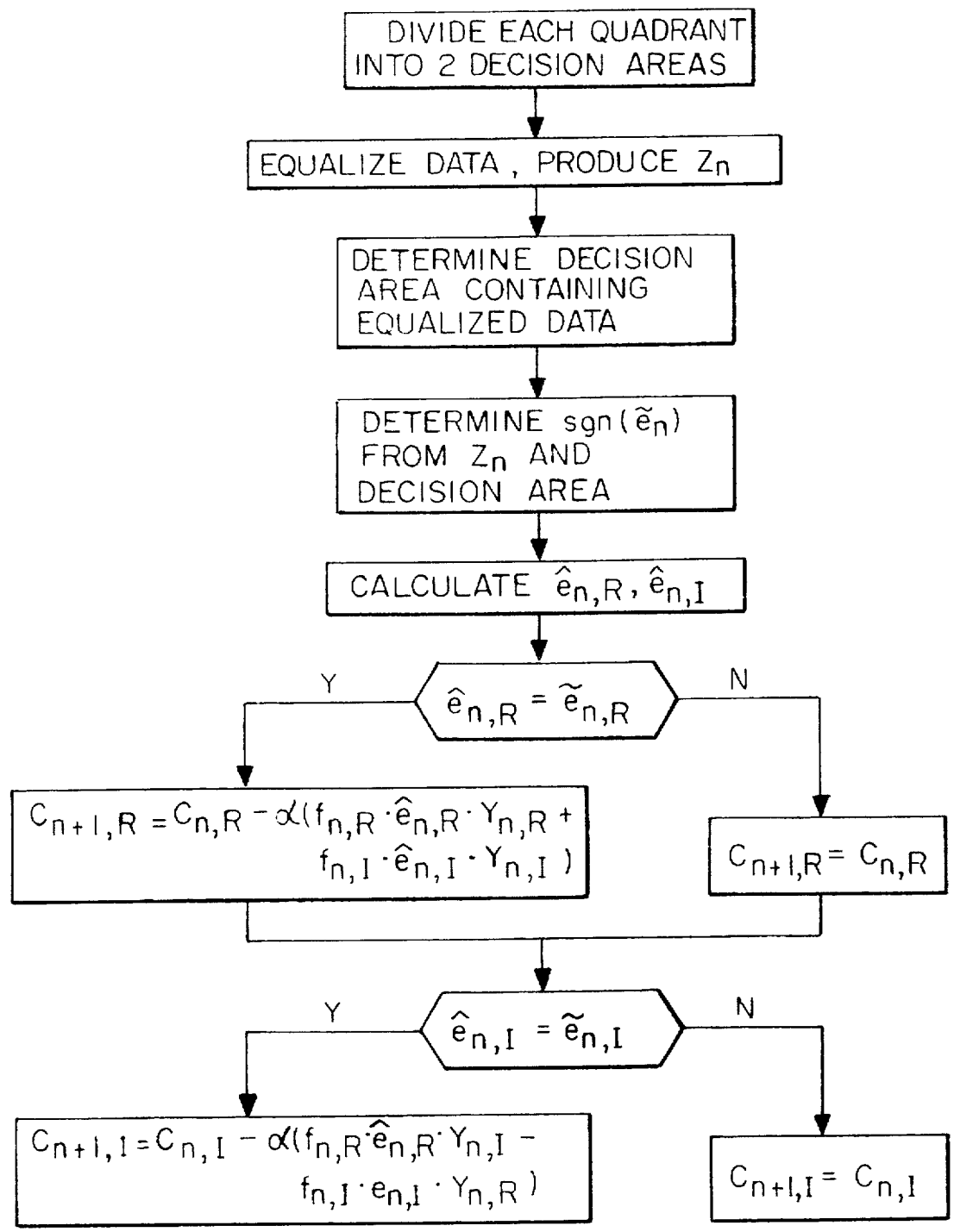
FIG. 10 is a flowchart showing a method for performing the present invention.

The present invention is performed according to FIG. 10, in which a decision area which is used for processing the transmitted signal is divided into two areas with respect to each quadrant.

Figure 1:
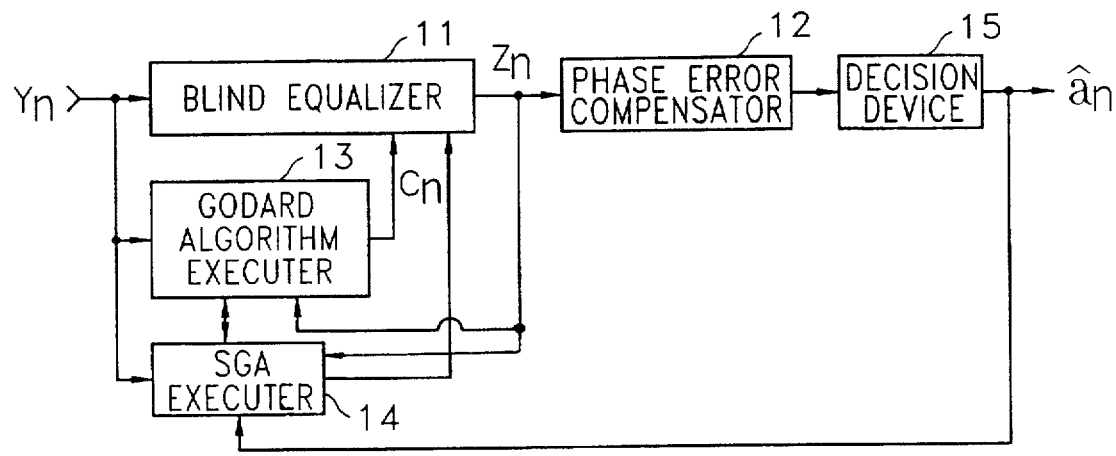
FIG. 1 is a block diagram showing a portion of a general digital communication receiver.
Figure 2:
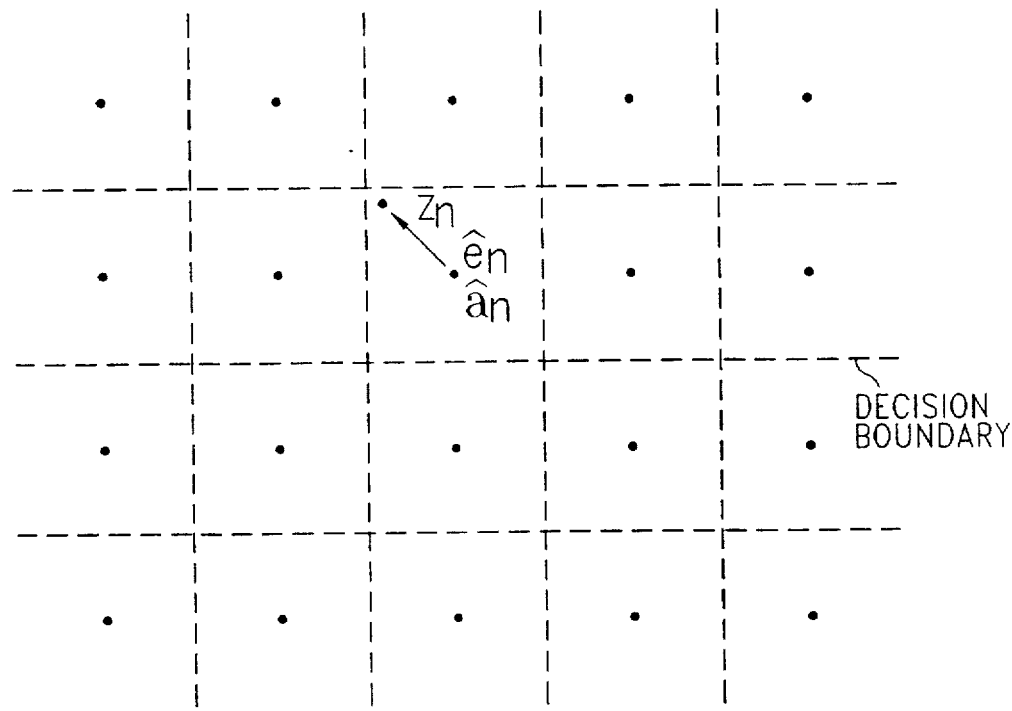
FIG. 2 is a conceptual diagram for explaining a decision error.
Figure 3:
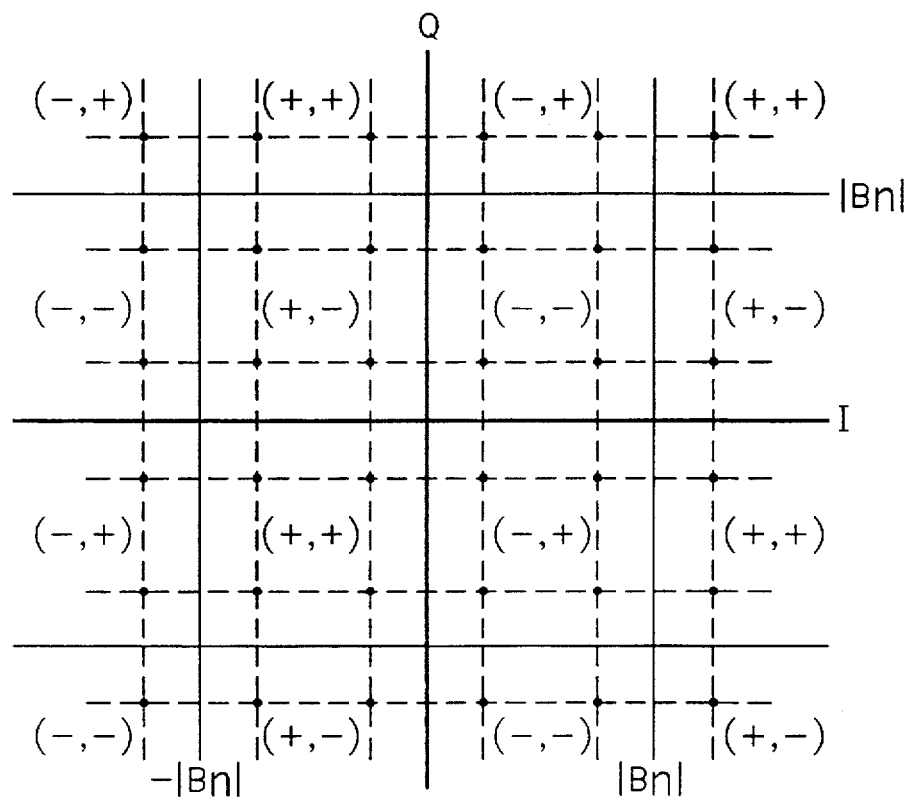
FIG. 3 is a conceptual diagram showing a conventional decision area dividing method.
Figure 4:
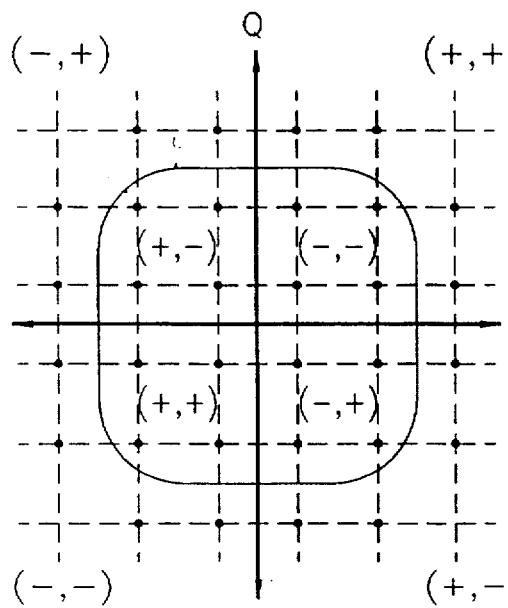
FIGS. 4 through 7 are conceptual diagrams showing embodiments of a decision area dividing method according to the present invention.

FIG. 4 shows the decision areas with respect to 32 QAM in the two-dimensional plane formed by the I-axis and Q-axis. The decision area is divided into eight areas in the two-dimensional plane which is represented by the I-axis and Q-axis as shown in FIG. 4. In addition, since the constellation of the received data is symmetrical to each other in the two-dimensional plane having the I- and Q-axis, division of the decision area should be symmetrical to each other. Thus, the decision areas in each quadrant are divided using two sign patterns in the present invention. For example, in the first quadrant, when the sign of the error vector $\hat{e}_n$ is (−,−), the DDA is performed within the decision area. If the DDA is to be performed outside of the decision area, the sign of error vector $\hat{e}_n$ will be (+,+). The division of the decision areas using the sign patterns is shown in FIGS. 4 through 7.

FIGS. 4 through 7 illustrate one embodiment of the decision area dividing method according to the present invention. These figures show mutually different examples with respect to the distribution state of the Sato-like error sign and the symmetrically divided decision area, and show sign pairs (a sign of the real part, a sign of the imaginary part) of actual error estimation data $\tilde{e}_n$ assigned by the present invention. A decision area which is close to the origin among the two decision areas in each quadrant of the two-dimensional plane is called an inner decision area, while the decision area located outside the inner decision area is called an outer decision area. Here, the sign pairs with respect to each quadrant are as follows. The respective sign pair in the inner decision area with respect to the first quadrant is (−,−), while the respective sign pair in the outer decision area with respect thereto is (+,+). In the second quadrant, the sign pair of the inner decision area is (+,−), while the sign pair of the outer decision area is (−,+). In the third quadrant, the sign pair of the inner decision area is (+,+), while the sign pair of the outer decision area is (−,−). In the fourth quadrant, the sign pair of the inner decision area is (−,+), while the sign pair of the outer decision area is (+,−).

Figure 5:
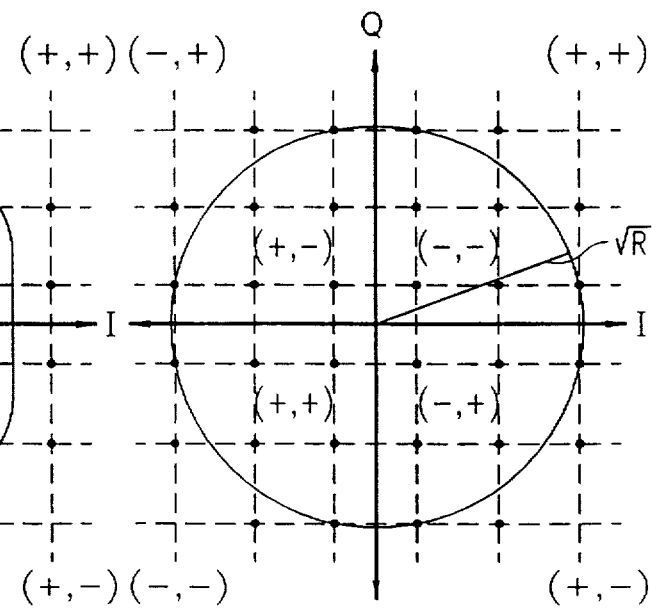
Figure 6:
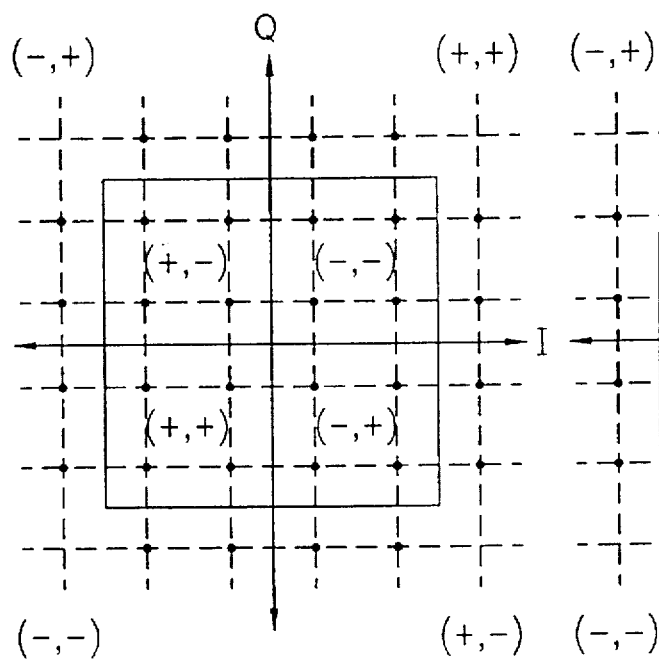
Figure 7:
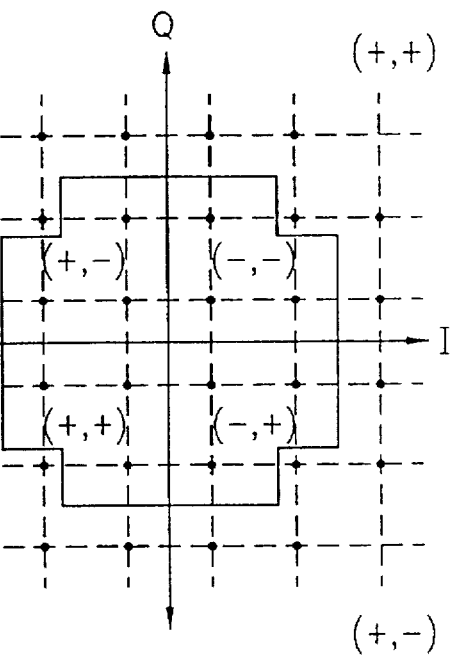
Figure 9:
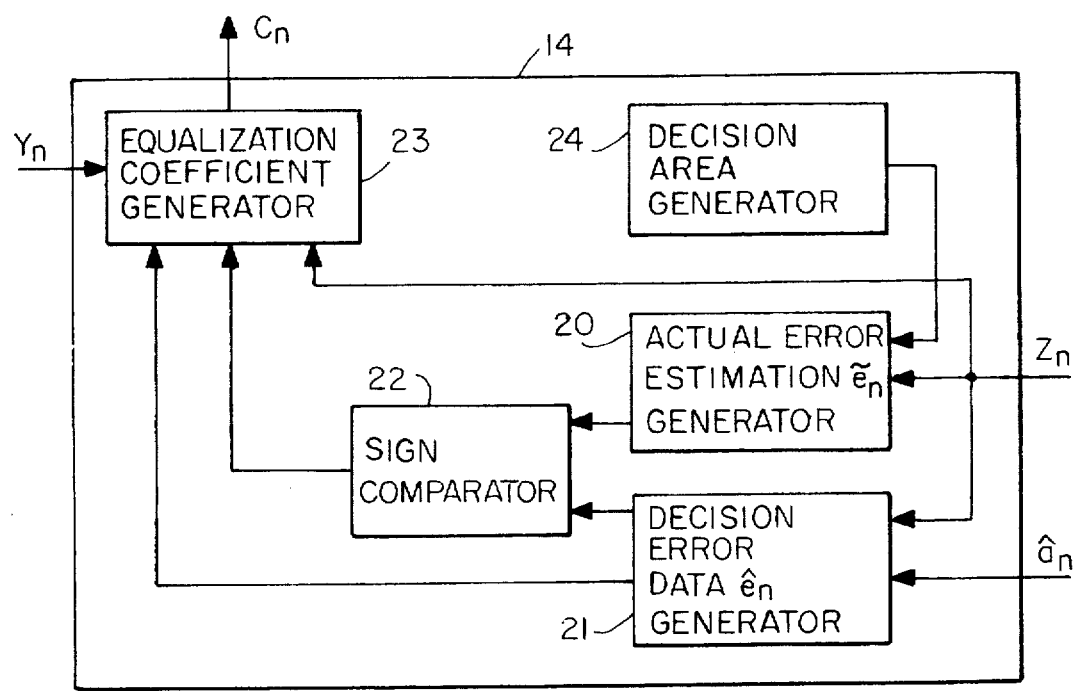
FIG. 9 is a block diagram showing a portion of a digital communication receiver according to the present invention.

In the FIGS. 5 through 7 examples, the respective decision areas are experimentally determined according to the system characteristics and generated by decision area generator 24, shown in FIG. 9. In the example illustrated by FIG. 5, a radius √R of the decision boundary is determined by the following equation, in which E is an expectation operator, and $a_n$ is an actual transmission symbol:

$$R = \frac{E[|a_n|^4]}{E[|a_n|^2]} \quad (6)$$

Here, "R" is an estimation value used in the Godard algorithm. The SGA executer 14 uses the decision areas shown in FIG. 5 to equalize the channel, as will now be described.

FIG. 10 shows, in flowchart form, a process for performing the present invention, and FIG. 9 shows an apparatus for performing the process shown in FIG. 10.

The Godard algorithm executer 13 receives a signal $Y_n$ to be equalized and converges an equalization coefficient. Thereafter, the SGA executer 14 receives the signal $Y_n$ to be equalized, the output signal $Z_n$ of the blind equalizer 11, and the output signal $â_n$ of the decision device 15, to update continuously the equalization coefficient. That is, the SGA executer 14 receives signals $Y_n$, $Z_n$, and $â_n$, calculates the sign of the actual error estimation data $\tilde{e}_n$ using the sign shown in FIG. 5, by way of actual error estimation $\tilde{e}_n$ generator 20 and continuously updates the equalization coefficient using equations (1) through (3) and (5) by way of an equalization coefficient generator 23. The SGA executer 14 compares the sign of the error vector $ê_n$ generated by a decision error data $ê_n$ generator 21 for all of the received data with that of the actual error estimation data $\tilde{e}_n$ generated by FIG. 5 by using a sign comparator 22. The SGA executer 14 judges whether the signs of the error vector $ê_n$ and actual error estimation data $ê_n$ coincide with each other. In addition, the SGA executer 14 compares the size of the error vector $ê_n$ with the radius √R of the decision boundary represented in equation (6). The manner of deciding by the corresponding decision area using the size of the error vector $ê_n$ and the value of the decision boundary is well known to a person of ordinary skill in the art. The SGA executer 14 performs the DDA if the sign of the error vector $ê_n$ coincides with that of the actual error estimation data $\tilde{e}_n$. If not, the SGA executer 14 does not perform the DDA.

Figure 8:
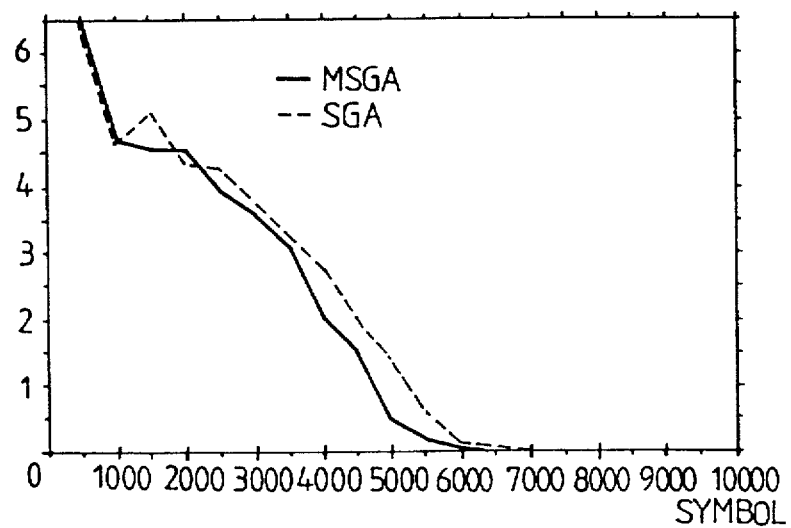
FIG. 8 is a graphical diagram showing the performance of the SGA and modified SGA, respectively.

FIG. 8 shows a graphical diagram for comparing the performance of the conventional SGA with that of the modified SGA (MSGA) according to the present invention. As graphically shown in FIG. 8, it can be seen that the convergence rate of the MSGA is faster than the conventional SGA, and the symbol error ratio of the former is smaller than that of the latter.

What is claimed is:

1. A decision directed algorithm control method for adaptively controlling an on-and-off operation of a decision directed algorithm (DDA) for use in a blind equalization system of a digital communication receiver, said decision directed algorithm control method comprising the steps of:

a) dividing each quadrant in the two-dimensional plane formed of a real number axis and an imaginary number axis into two decision areas;

b) determining which decision area among the decision areas includes output data of an equalizer;

c) calculating a sign of actual error estimation data ($\tilde{e}_n$) according to the result of step b) and the output data of the equalizer;

d) calculating decision error data ($ê_n$) using a first set of predetermined equations in response to output data ($Z_n$) of the blind equalization system and decided data ($â_n$) produced by the DDA, said first set of predetermined equations including:

$$ê_{n,R} = Z_{n,R} - â_{n,R}$$

$$ê_{n,I} = Z_{n,I} - â_{n,I};$$

wherein $ê_{n,R}$ and $ê_{n,I}$ are a real part and an imaginary part of $ê_n$, respectively;

e) comparing a sign of the real part R and a sign of the imaginary part I of the respective decision error data $ê_n$ and the respective actual error estimation data $\tilde{e}_n$ with each other; and f) executing an algorithm in accordance with a second set of predetermined equations with respect to the real part R and the imaginary part I, respectively, according to the result of step e) to update an equalization coefficient C of the blind equalization system, said second set of predetermined equations including:

$$C_{n+1,R} = C_{n,R} - \alpha(f_{n,R} \cdot ê_{n,R} \cdot Y_{n,R} + f_{n,I} \cdot ê_{n,I} \cdot Y_{n,I}),$$

and $$C_{n+1,I} = C_{n,I} + \alpha(f_{n,R} \cdot ê_{n,R} \cdot Y_{n,I} - f_{n,I} \cdot ê_{n,I} \cdot Y_{n,R})$$

$$\text{wherein, } f_{n,R} = \begin{cases} 1 & \text{when } sgn\, ê_{n,R} = sgn\, \tilde{e}_{n,R} \\ 0 & \text{when } sgn\, ê_{n,R} \neq sgn\, \tilde{e}_{n,R} \end{cases}$$

$$\text{wherein, } f_{n,I} = \begin{cases} 1 & \text{when } sgn\, ê_{n,I} = sgn\, \tilde{e}_{n,I} \\ 0 & \text{when } sgn\, ê_{n,I} \neq sgn\, \tilde{e}_{n,I} \end{cases}$$

wherein $Y_{n,R}$ is the real part of an input vector of the blind equalization system, and $Y_{n,I}$ is the imaginary part of the input vector.

2. A decision directed algorithm control method according to claim 1, wherein said step a) comprises the steps of:

a1) setting signs of the real part and the imaginary part of the actual error estimation data with respect to an inner decision area of the first quadrant in the two-dimensional plane as (−,−), respectively;

a2) setting signs of the real part and the imaginary part of the actual error estimation data with respect to an outer decision area of the first quadrant in the two-dimensional plane as (+,+), respectively;

a3) setting signs of the real part and the imaginary part of the actual error estimation data with respect to an inner decision area of the second quadrant in the two-dimensional plane as (+,−), respectively;

a4) setting signs of the real part and the imaginary part of the actual error estimation data with respect to an outer decision area of the second quadrant in the two-dimensional plane as (−,+), respectively;

a5) setting signs of the real part and the imaginary part of the actual error estimation data with respect to an inner decision area of the third quadrant in the two-dimensional plane as (+,+), respectively;

a6) setting signs of the real part and the imaginary part of the actual error estimation data with respect to an outer decision area of the third quadrant in the two-dimensional plane as (−,−), respectively;

a7) setting signs of the real part and the imaginary part of the actual error estimation data with respect to an inner decision area of the fourth quadrant in the two-dimensional plane as (−,+), respectively; and a8) setting signs of the real part and the imaginary part of the actual error estimation data with respect to an outer decision area of the fourth quadrant in the two-dimensional plane as (+,−), respectively.

3. A decision directed algorithm control method according to claim 1, wherein said step a) further comprises the step of setting a decision area by setting a square root value (√R) of decision data (R) as a boundary value, said decision data (R) being calculated by the equation:

$$R = \frac{E[|a_n|^4]}{E[|a_n|^2]}$$

wherein E is an expectation operator and $a_n$ is an actual transmission symbol.

4. A digital communication receiver in a communication system in which a transmitter does not insert a training sequence into a transmission signal for transmission to the receiver, said receiver comprising:

a decision directed algorithm device for performing a decision directed algorithm (DDA) and outputting decided data ($â_n$);

an equalizer disposed within said receiver for equalizing said input signal according to a predetermined algorithm including the decision directed algorithm (DDA) and equalization coefficients C, and outputting equalized data $Z_n$;

a controller, coupled to said equalizer, for adaptively controlling an on-and-off operation of the DDA device, said controller comprising:

means for determining whether an output of said equalizer falls in or out of predetermined decision areas, said predetermined decision areas being formed by dividing each quadrant of a two-dimensional plane having a real number axis and an imaginary number axis into only two decision areas;

means for calculating a sign of actual error estimation data $\bar{e}_n$ based on $Z_n$ produced by said equalizer and an output of said means for determining whether an output of said equalizer falls in or out of predetermined decision areas;

means for calculating decision error data $ê_n$ in accordance with a first set of predetermined equations in response to the equalized data $Z_n$ and the decided data $â_n$, said first set of predetermined equations comprising:

$$ê_{n,R} = Z_{n,R} - â_{n,R}$$

$$ê_{n,I} = Z_{n,I} - â_{n,I};$$

wherein $ê_{n,R}$ and $ê_{n,I}$ are a real part and imaginary part of $ê_n$, respectively;

means for comparing a sign of the real part R and a sign of the imaginary part I of the respective decision error data $ê_n$ and the respective actual error estimation data $\bar{e}_n$ with each other; and means for updating the equalization coefficients C of said equalizer with respect to the real R and imaginary I parts according to the following equations:

$$C_{n+1,R} = C_{n,R} - \alpha(f_{n,R} \cdot ê_{n,R} \cdot Y_{n,R} + f_{n,I} \cdot ê_{n,I} \cdot Y_{n,I}),$$

and $$C_{n+1,I} = C_{n,I} + \alpha(f_{n,R} \cdot ê_{n,R} \cdot Y_{n,I} - f_{n,I} \cdot ê_{n,I} \cdot Y_{n,R})$$

$$\text{wherein, } f_{n,R} = \begin{cases} 1 \text{ when } sgn\ ê_{n,R} = sgn\ \bar{e}_{n,R} \\ 0 \text{ when } sgn\ ê_{n,R} \neq sgn\ \bar{e}_{n,R} \end{cases}$$

$$\text{wherein, } f_{n,I} = \begin{cases} 1 \text{ when } sgn\ ê_{n,I} = sgn\ \bar{e}_{n,I} \\ 0 \text{ when } sgn\ ê_{n,I} \neq sgn\ \bar{e}_{n,I} \end{cases}$$

wherein, $Y_{n,R}$ is the real part of an input vector of the blind equalization system, and $Y_{n,I}$ is the imaginary part of the input vector.

5. The digital communication receiver according to claim 4, wherein a sign is assigned to each decision area of said quadrants, and said output of said means for determining whether an output of said equalizer falls in or out of predetermined decision areas is one of said signs assigned to each decision area.

* * * * *